Figures 1, 2:
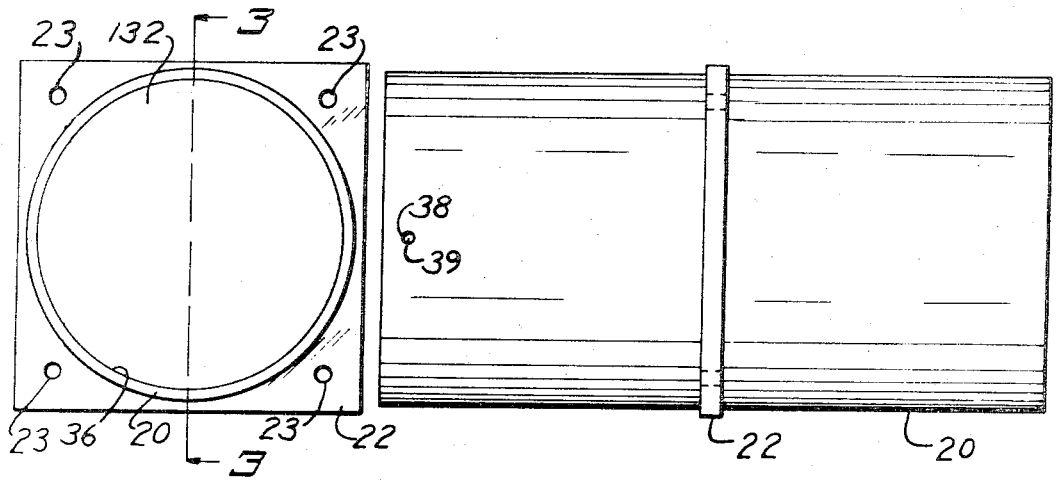

April 11, 1967  W. A. BUNDSCHUH  3,313,162
GYROSCOPIC APPARATUS

Original Filed Sept. 4, 1962  3 Sheets-Sheet 1

INVENTOR.
WILLIAM A. BUNDSCHUH
BY
Roy Eilers
ATTORNEY

April 11, 1967     W. A. BUNDSCHUH     3,313,162
GYROSCOPIC APPARATUS

Original Filed Sept. 4, 1962     3 Sheets-Sheet 2

INVENTOR.
WILLIAM A. BUNDSCHUH
BY
Roy Eilers
ATTORNEY

INVENTOR.
WILLIAM A. BUNDSCHUH
BY Rey Eilers
ATTORNEY

United States Patent Office 3,313,162
Patented Apr. 11, 1967

3,313,162
GYROSCOPIC APPARATUS
William A. Bundschuh, Lemay, Mo., assignor to Universal Match Corporation, St. Louis, Mo., a corporation of Delaware
Original application Sept. 4, 1962, Ser. No. 221,229. Divided and this application June 17, 1964, Ser. No. 375,894
15 Claims. (Cl. 74—5.6)

This invention relates to improvements in gyroscopic apparatus. More particularly, this invention relates to improvements in rate gyroscopes.

It is, therefore, an object of the present invention to provide an improved rate gyroscope.

This is a division of U.S. patent application Ser. No. 221,229, which was filed on Sept. 4, 1962, by Allan W. Lindberg and myself, for Gyroscopic Apparatus.

The heavy liquid in the generally spherical recess of the rotatable member of the rate gyroscope provided by the present invention is preferably a conductive liquid. Such a liquid can serve as a generator rotor and as a one turn primary winding of a transformer; and can thus help generate a signal which can be used to measure the rate at which the orientation of a movable device departs from parallelism with a straight line. As a result, the heavy liquid in the generally spherical recess of the rotatable member of the rate gyroscope provided by the present invention performs multiple functions. It is, therefore, an object of the present invention to provide a rate gyroscope with a rotatable member that has a generally spherical recess in which a heavy conductive liquid can be held, and which can serve as a generator rotor and as a one turn primary winding of a transformer.

Other and further objects and advantages of the present invention should become apparent from an examination of the drawing and accompanying description.

In the drawing and accompanying description a preferred embodiment of the present invention is shown and described, but it is to be understood that the drawing and accompanying description are for the purpose of illustration only and do not limit the invention and that the invention will be defined by the appended claims.

Figure 3:
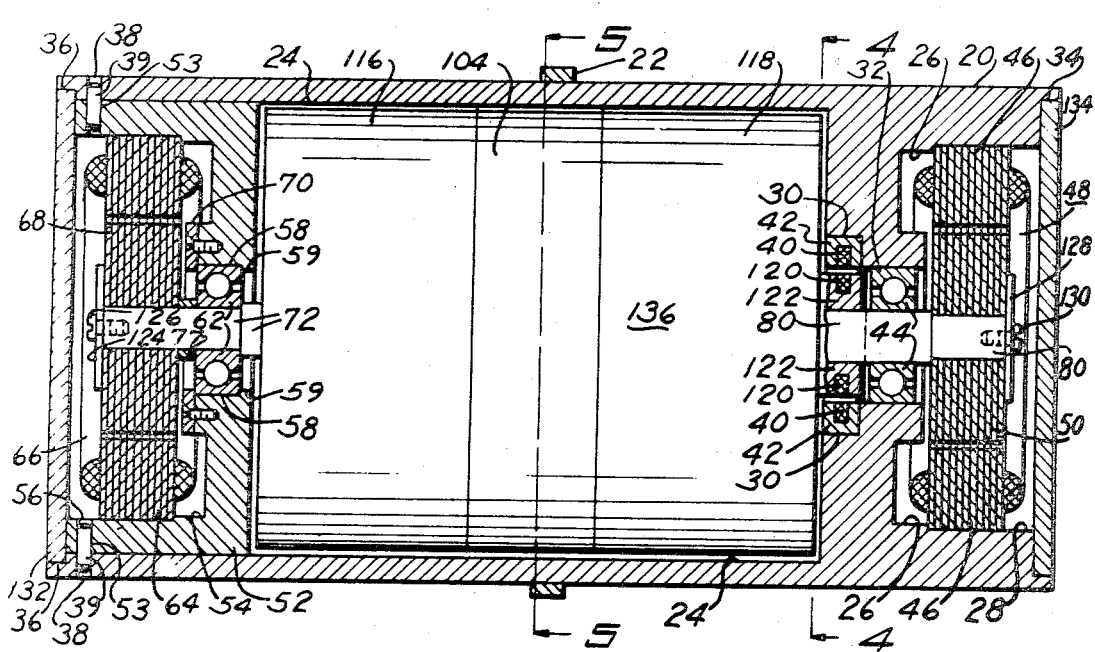
Figure 4:
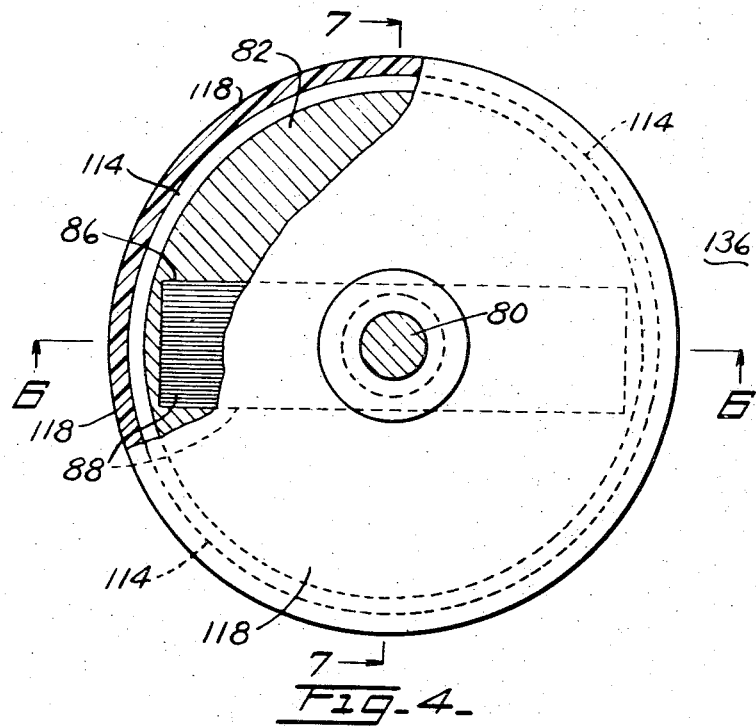
Figure 5:
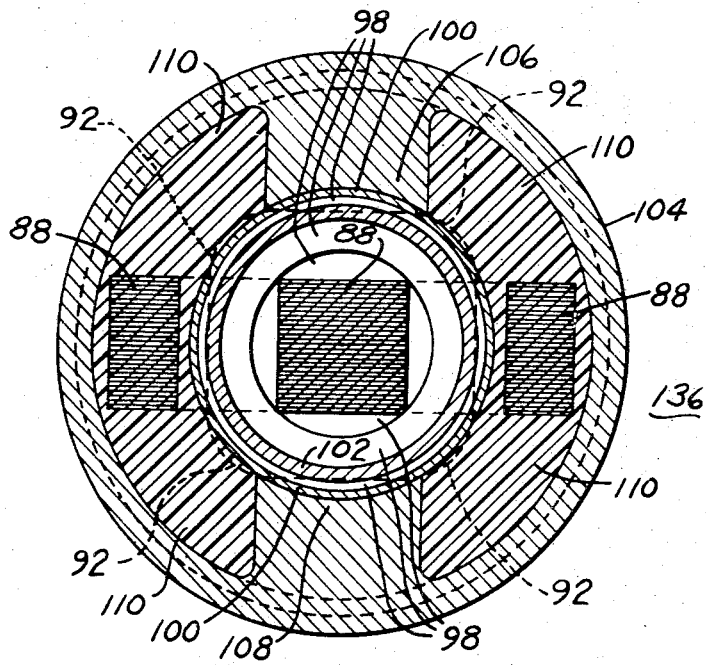
Figure 6:
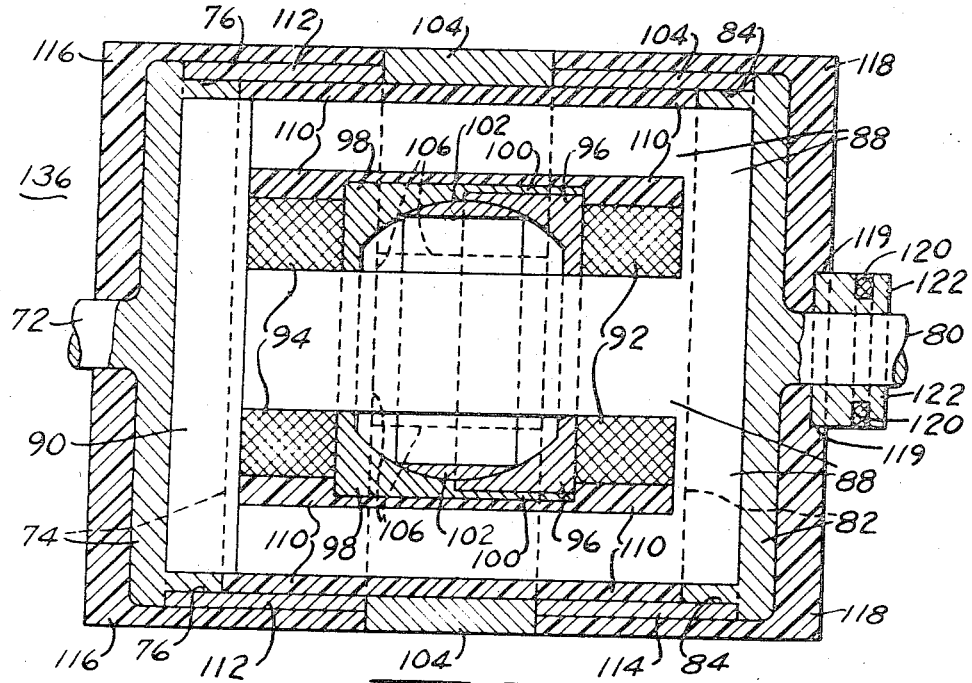
Figure 7:
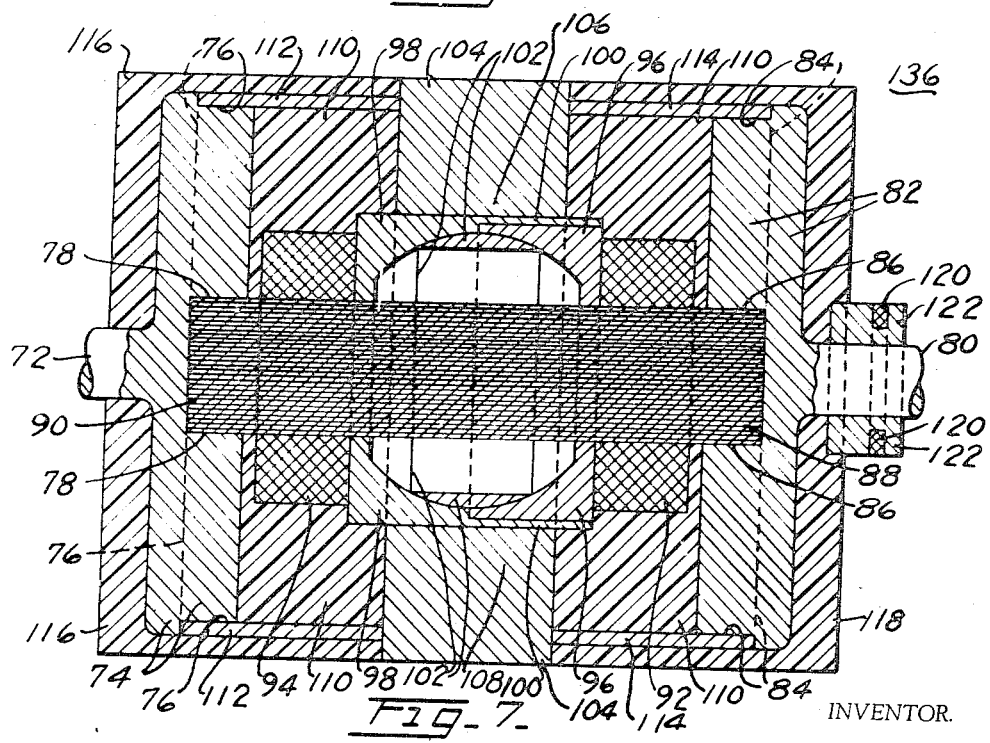

In the drawing,

FIG. 1 is an end elevational view of one embodiment of rate gyroscope that is made in accordance with the principles and teachings of the present invention, FIG. 2 is a side elevational view of the rate gyroscope shown in FIG. 1, FIG. 3 is a sectional view, on a larger scale, of the rate gyroscope shown in FIGS. 1 and 2, and it is taken along the plane indicated by the line 3—3 in FIG. 1, FIG. 4 is a partially broken-away, partially-sectioned view, on a still larger scale, of the rotatable member of the rate gyroscope shown in FIGS. 1–3, and it is taken along the plane indicated by the line 4—4 in FIG. 3, FIG. 5 is a sectional view, on the scale of FIG. 4, through the rotatable member of the rate gyroscopes shown in FIGS. 1–3, and it is taken along the plane indicated by the line 5—5 in FIG. 3, FIG. 6 is a partially-broken sectional view, on the scale of FIG. 4, through the rotatable member of the rate gyroscope shown in FIGS. 1–3, and it is taken along the plane indicated by the line 6—6 in FIG. 4, and FIG. 7 is another partially-broken, sectional view, on the scale of FIG. 4, through the rotatable member of the rate gyroscope shown in FIGS. 1–3, and it is taken along the plane indicated by the line 7—7 in FIG. 4.

Referring to the drawing in detail, the numeral 20 denotes a housing for one form of rate gyroscope that is made in accordance with the principles and teachings of the present invention. That housing has a cylindrical exterior of right circular cross section. A mounting plate for that rate gyroscope is denoted by the numeral 22, and that mounting plate has a central, circular opening therein which can provide a press fit with the exterior of the housing 20. That mounting plate also has four openings 23 therein which can accommodate screws or other fasteners that will secure that mounting plate to a suitable support.

The housing 20 has a large cylindrical recess 24 therein; and that recess extends substantially all the way to the left-hand end of that housing, as shown particularly by FIG. 3. The diameter of the recess 24 is just slightly smaller than the external diameter of the housing 20; and hence a relatively thin wall defines that recess. However, that relatively thin wall will be stiff enough to be rigid and unyielding. The numeral 26 denotes a cylindrical recess in the housing 20; and that recess extends toward the right-hand end of that housing. A slightly larger, cylindrical recess 28 is interposed between the recess 26 and the right-hand end of the housing 20; and the recess 28 extends almost all the way to the right-hand end of that housing. A relatively short, cylindrical recess 30 is formed in the housing 20 adjacent the right-hand end of the recess 24, and the diameter of the recess 30 is much smaller than that of the recess 24. A cylindrical socket 32 is provided in the housing 20 intermediate the cylindrical recess 30 and the cylindrical recess 26. The cylindrical socket 32 extends part way into the cylindrical recess 26, because it extends through an annular projection which extends into that cylindrical recess. A large-diameter cylindrical recess 34 is formed in the housing 20 at the right-hand end of that housing; and a large-diameter cylindrical recess 36 is provided in that housing adjacent the left-hand end of that housing. The recess 34 is contiguous with the recess 28; and the recess 36 is contiguous with the recess 24. The various cylindrical recesses 24, 26, 28, 30, 34, and 36 and the cylindrical socket 32 are formed so they are all precisely concentric.

The numeral 38 denotes radially-directed openings, which are formed in the relatively thin wall of the housing 20, adjacent the left-hand end of that housing. Those openings open to, and communicate with, the recess 24 within that housing.

The numeral 40 denotes an annular coil, and the numeral 42 denotes an annular coil form. That coil form has an annular recess at the inner periphery thereof, and the coil 40 is disposed within that recess. The outer periphery of the coil form 42 is dimensioned to telescope within the cylindrical recess 30 in the housing 20, as shown particularly by FIG. 3. The coil 40 constitutes the secondary winding of a transformer.

The numeral 44 denotes an anti-friction bearing which has the outer race thereof telescoped within the cylindrical socket 32 in the housing 20. That anti-friction bearing is disposed to the right of the recess 30, and is thus out of alinement with the coil 40 which is held by the coil form 42 in that recess.

The numeral 46 denotes the stator of a reference generator which is generally denoted by the numeral 48. The stator 46 is formed from a number of laminations; and it is disposed within the cylindrical recess 28. A shoulder is formed between the recess 26 and the recess 28, and the left-hand edge of the stator 46 abuts that shoulder. The stator 46 of the reference generator 48 is provided with a suitable winding, and that reference generator also is provided with a rotor 50. The reference generator 48 is a two phase generator of standard and usual design and construction.

The numeral 52 denotes a cup-shaped insert which is telescoped within the left-hand end of the recess 24 in the housing 20. The outer diameter of that cup-shaped insert is just stlightly smaller than the inner diameter of the recess 24 so that cup-shaped insert can fit snugly within that recess. Radially-directed openings 53 are provided in the cup-shaped insert 52, and those openings can be set in register with the openings 38 in the relatively thin wall of the housing 20. Pins 39 can be telescoped through the openings 38 and into the radially-directed openings 53 in the cup-shaped insert 52 to fixedly hold that cup-shaped insert in position within the recess 24.

The cup-shaped insert 52 has a cylindrical recess 54 adjacent the closed end thereof, and it has a large diameter recess 56 opening to the left-hand end thereof. The diameter of the cylindrical recess 56 is just slightly larger than the diameter of the cylindrical recess 54; but a radially-directed shoulder is provided between those recesses, as shown particularly by FIG. 3. A cylindrical socket 58 is provided in the cup-shaped insert 52; and that socket is contiguous with, and communicates with, the cylindrical recess 54. An annular shoulder 59 defines the right-hand end of the cylindrical socket 58, as shown particularly by FIG. 3. The cylindrical recesses 54 and 56, and the cylindrical socket 58 are formed so they are precisely concentric with the outer surface of the cup-shaped insert 52; and that outer surface is concentric with the hereinbefore-mentioned cylindrical recesses of the housing 20. Consequently, the cylindrical recesses 54 and 56 and the cylindrical socket 58 of the cup-shaped insert 52 are precisely concentric with the hereinbefore-mentioned cylindrical recesses and cylindrical socket of the housing 20.

The numeral 62 denotes an anti-friction bearing which has the outer race thereof telescoped within the cylindrical socket 58 in the cup-shaped member 52; and the right-hand face of that outer race abuts the shoulder 59 at the right-hand end of the cylindrical socket 58. An annular retaining ring 70 abuts the left-hand face of the outer race of the anti-friction bearing 62 and thereby fixedly holds that anti-friction bearing in position. Suitable fasteners, such as screws, pass through the retaining ring 70 and seat in threaded sockets in the cup-shaped member 52, as shown particularly by FIG. 3. The anti-friction bearing 62 has the axis thereof precisely coaxial with the axis of the anti-friction bearing 44.

The numeral 64 denotes the stator of a motor which is denoted by the numeral 66; and that stator is formed from a number of laminations. The right-hand face of the stator 64 abuts the shoulder intermediate the cylindrical recesses 54 and 56 in the cup-shaped member 52; and that stator has a winding, as shown particularly by FIG. 3. The motor 66 has a rotor 68 which is disposed within the stator 64 and which responds to the winding on that stator to rotate.

The numeral 74 denotes a large circular disc which has a stub shaft 72 thereon; and that disc is shown particularly by FIGS. 6 and 7. That stub shaft extends through the geometric center of the rotor 68 of the motor 66 and serves to support that rotor. A spacer 77 is telescoped over the stub shaft 72 and abuts the rotor 68 and the inner race of the anti-friction bearing 62. The thickness of that spacer will be selected to dispose the rotor 68 in register with the stator 64.

The large circular disc 74 has a circumferentially-extending, annular recess 76 in the periphery thereof; and that recess is adjacent the right-hand end of that disc, as that disc is viewed in FIGS. 6 and 7. That large circular disc also has a straight diametrically-extending recess 78 therein, and that recess is shown particularly by FIG. 7. That recess extends completely across the right-hand face of that disc, as that disc is viewed in FIGS. 6 and 7.

The numeral 82 denotes a second large circular disc which has a stub shaft 80 thereon; and that disc is very similar to the disc 74. The large circular discs 82 and 74 are disposed so the stub shafts 72 and 80 extend outwardly from those discs; and this means that the circumferentially-extending annular recess 84 of disc 82 will confront the circumferentially-extending annular recess 76 of disc 74. Further, it means that the diametrically-extending recess 86 of disc 82 will confront the diametrically-extending recess 78 of disc 74. As shown by FIG. 7, the diametrically-extending recess 86 will be alined with, and in register with, the diametrically-extending recess 78.

The numeral 88 denotes an E-shaped magnetic core; and the closed end of that core is disposed within the diametrically-extending recess 86 of the disc 82. The three arms of the E-shaped core 88 extend toward, but stop short of, the diametrically-extending recess 78 in the disc 74. An I-shaped cap 90 for the E-shaped core 88 is disposed within the diametrically-extending recess 78 in the disc 74; and that I-shaped cap abuts the ends of the arms of that E-shaped core, as shown particularly by FIGS. 6 and 7. The E-shaped core 88 and the I-shaped cap 90 are disposed in such close proximity to each other that substantially no air gap exists between that I-shaped cap and the ends of the arms of that E-shaped core.

The numeral 92 denotes a signal pick-up coil which is wound on the middle arm of the E-shaped core 88 and which abuts the closed end of that E-shaped core. The numeral 94 denotes a signal pick-up coil which is wound on the middle arm of the E-shaped core 88 and which abuts the I-shaped cap 90. A container is disposed intermediate the signal pick-up coils 92 and 94; and that container has a cup-shaped portion 96 which abuts the left-hand face of the coil 92, as that coil is viewed in FIGS. 6 and 7. That container has a second cup-shaped portion 98; and that second cup-shaped portion abuts the right-hand face of the coil 94 as that coil is viewed in FIGS. 6 and 7. The cup-shaped portion 98 is formed with an annular extension 100 which is dimensioned to telescope over the outer periphery of the cup-shaped portion 96, as shown particularly by FIGS. 6 and 7.

The cup-shaped portions 96 and 98 of the container, which is intermediate the coils 92 and 94, have partially spherical interiors so they can coact with each other to define a generally spherical recess within that container. Those portions of the interiors of the cup-shaped portions 96 and 98 which are adjacent the coils 92 and 94 are flat, but the portions of those interiors which are intermediate those flat portions are almost perfectly spherical. The flat portions of the interiors of the cup-shaped portions 96 and 98 have rectangular openings therein to accommodate the middle arm of the E-shaped core 88. The engagements between those rectangular openings and the middle arm of the E-shaped core 88 are rendered tight enough to prevent the passage of liquid through the joints between that middle arm and those cup-shaped portions. As a result the container, which is intermediate the coils 92 and 94, is capable of holding a quantity of liquid 102. In the preferred form of the present invention, that liquid is mercury; because mercury is very heavy and because it is a conductor of electricity. In assembling the rate gyroscope provided by the present invention, the cup-shaped portions 96 and 98 of the container are telescoped over the middle arm of the E-shaped core 88 and are pressed into intimate engagement with each other. Thereafter, the hollow needle of a syringe is caused to penetrate one of the walls of one of the cup-shaped portions 96 and 98; and that syringe is then caused to inject the desired amount of liquid 102 into the generally spherical recess defined by those cup-shaped portions.

The numeral 104 denotes a permanent magnet which is annular in form and which has a pole 106 and a pole 108, as shown particularly by FIG. 5. The poles 106 and 108 extend toward each other; and the confronting faces of those poles are curved to enable them to snugly engage the outer periphery and the annular extension 100 of the cup-shaped section 98, of the container which is mounted intermediate the coils 92 and 94. The permanent magnet 104 is wide, as shown particularly by FIGS. 6 and 7; and it is wider than the annulus which will be defined by the liquid 102 when centrifugal force holds that liquid against the inner surface of the generally spherical recess defined by the cup-shaped portions 96 and 98. As indicated particularly by FIGS. 5 and 7, the poles 106 and 108 define an axis which is at right angles to the plane of the magnetic core which includes the E-shaped core 88 and the I-shaped cap 90.

A shield 112, of a high permeability metal, has the left-hand end thereof telescoped into the circumferential recess 76 at the right-hand end of the disc 74; and the right-hand end of that shield extends to and abuts the left-hand face of the permanent magnet 104. A similar shield 114 has the right-hand end thereof telescoped into the circumferential recess 84 at the left-hand end of the disc 82; and the left-hand end of that shield extends to and abuts the right-hand face of the permanent magnet 104. The shields 112 and 114 are generally cylindrical; but they are preferably made with gaps or perforations therein. A relatively large space is formed between the interiors of the shields 112 and 114 and the exteriors of the coils 94 and 92, the exteriors of the cup-shaped sections 98 and 96 of the container, the exposed surfaces of the E-shaped core 88 and of the I-shaped cap 90, the exposed surfaces of the poles 106 and 108, and the inner periphery of the permanent magnet 104; and that space will be filled with a suitable filling material 110. While different filling materials could be used, one of the epoxy resins has been found to be very suitable.

A coil form 122, of annular form, is telescoped over the stub shaft 80; and the engagement between that coil form and that stub shaft is intimate enough to cause that coil form to rotate with that stub shaft. An annular recess is formed in the coil form 122 adjacent the right-hand end thereof, and an annular coil 120 is disposed within that recess. As shown particularly by FIG. 3, the coil form 122 is intended to hold the coil 120 in register with the coil 40.

A cup-shaped closure 116 telescopes over the stub shaft 72, the disc 74, and the shield 112; and the right-hand end of that closure 116 abuts the left-hand face of the permanent magnet 104. A cup-shaped closure 118 telescopes over the stub shaft 80, the disc 82, and the shield 114; and the left-hand end of that closure 118 abuts the right-hand face of the permanent magnet 104. The closures 116 and 118 thus coact with the permanent magnet 104 to form a substantially continuous closure for the container, the coils, the core, and the magnetic poles of the rate gyroscope. The cup-shaped closures 116 and 118 are preferably formed by molding them onto the stub shafts 72 and 80, the disc 74 and 82, and the shields 112 and 114; and they will preferably be formed of the same material which is used as the filling material 110. Further, those cup-shaped closures will preferably be formed at the same time that filling material is introduced into the space between the interiors of the shields 112 and 114 and the exteriors of the coils 94 and 92, the exteriors of the cup-shaped sections 98 and 96 of the container, the exposed surfaces of the E-shaped core 88 and the I-shaped cap 90, the exposed surfaces of the poles 106 and 108, and the inner periphery of the permanent magnet 104. The E-shaped core 88 can be assembled with the disc 82, the coil form 122 can be telescoped onto the stub shaft 80, the I-shaped cap 90 can be assembled with the disc 74, the coil 92 and the container for the liquid 102 and the coil 94 can be telescoped onto the middle arm of the E-shaped core 88, the shield 114 can be set in position, the annular magnet 104 can be telescoped over the container for the liquid 102, the shield 112 can be set in position, and then the disc 74 can be set in position. At this time, the resulting assembly can be disposed within a mold; and then the filling material 110 and the material of which the cup-shaped closure 116 and 118 are made can be forced into that mold. The resulting molded member 136 will constitute the rotatable member of the rate gyroscope.

A washer 124 abuts the left-hand end of the stub shaft 72 and presses against the left-hand end of the rotor 68 of motor 66. A fastener 126, shown as a machine screw, passes through the opening in the washer 124 and seats in a threaded socket in the outer end of the stub shaft 72. That fastener fixedly secures the rotor 68 to the stub shaft 72 and causes the stub shaft 72 to rotate with the rotor 68 of motor 66.

The numeral 128 denotes a washer which abuts the right-hand end of the stub shaft 80 and presses against the right-hand face of the rotor 50 of reference generator 48. A fastener 130, shown as a machine screw, extends through the opening in the washer 128 and seats in a threaded socket in the free end of the stub shaft 80. That washer holds the rotor 50 in assembled relation with the stub shaft 80 and causes that rotor to rotate with that shaft.

The numeral 132 denotes a relatively large circular disc which is telescoped within the cylindrical recess 36 in the left-hand end of the housing 20; and that disc serves as a closure for the cylindrical recesses 56 and 54 in the cup-shaped closure 52. A relatively large circular disc 134 is telescoped within the cylindrical recess 34 in the right-hand end of the housing 20; and that disc serves as a closure for the cylindrical recesses 26 and 28 of that housing. The engagements between the closures 132 and 134 and the cylindrical recesses 36 and 34 of housing 20 will be sufficiently intimate to prevent the ingress of foreign materials.

Suitable conductors, not shown, will extend through a passage in the housing 20 and through a passage in the cup-shaped insert 52 to the winding of the motor 66; and those conductors will supply power to that winding. Further conductors, not shown, will interconnect the coils 94, 92 and 120; and the coils 92 and 94 will be connected to serve as the secondary winding of a transformer, of which the liquid 102 serves as a one turn primary winding, while the coil 120 will serve as the primary winding of a transformer of which the winding 40 is the secondary winding. The coils 92 and 94 will supply a signal to the coil 120; and that signal will be coupled to the coil 40 by transformer action. Additional conductors, not shown, will extend from the coil 40 through passages in the housing 20 to phase sensitive detectors. Still further conductors, not shown, will extend from the winding of the reference generator 48 through passages in the housing 20 to those phase sensitive detectors. The various conductors will be suitably connected to the various components of the rate gyroscope before the filling material 110 and the closures 116 and 118 are formed and bonded to those various components.

In the operation of the rate gyroscope provided by the present invention, the motor 66 will rotate the molded member 136 and the rotor of the reference generator 48 at a high rate of speed. For example, in the said preferred embodiment of the present invention, that motor rotates that molded member and that rotor at a speed of about forty-two hundred revolutions per minute. As the molded member 136 rotates, the liquid 102 will assume the annular configuration shown in FIGS. 6 and 7, and will normally have the spin axis thereof coincident with the spin axis of the molded member 136. The spin axis of the molded member 136 can be set precisely parallel to the axis of movement of a movable device such as an aircraft, missile, or the like. The molded member 136 will serve as an outer rotor and the liquid 102 will serve as an inner rotor for the rate gyroscope.

As long as the axis of movement of the movable device is parallel to a straight line, the axes of rotation of the inner rotor 102 and of the outer rotor 136 will remain precisely coincident. However, if the axis of movement of the movable device rotates away from that straight line, about an axis which is perpendicular to that axis of movement, the spin axis of the outer rotor 136 will experience a similar rotation but the spin axis of the inner rotor 102 will tend to remain parallel to that straight line. This means that the spin axis of the outer rotor 136 will shift relative to the spin axis of the inner rotor 102.

As long as the spin axes of the inner and outer rotors 102 and 136 are precisely coincident, there will be no relative axial displacement between any portions of the inner rotor 102 and the magnetic field provided by the permanent magnet 104; and hence that inner rotor will not cut any flux lines of that magnetic field. However, when the spin axis of the outer rotor 136 rotates about the said perpendicular axis—and thus shifts away from the spin axis of the inner rotor 102—the said magnetic field will wobble relative to the inner rotor 102, thereby providing relative axial displacement between that inner rotor and that magnetic field. Specifically, a plane through the center of the magnetic field will become inclined to the plane through the center of the inner rotor 102; and, during each revolution of the inner and outer rotors 102 and 136, the pole 106 will start at one side of the said plane through the center of the inner rotor 102, will move toward that plane during the first ninety degrees of that revolution, will pass through and beyond that plane during the second ninety degrees of that revolution until it is as far on the opposite side of the said plane as it was on the first side of that plane at the start of that revolution, will then move back toward that plane during the third ninety degrees of that revolution, and will finally pass back through and beyond that plane during the fourth ninety degrees of that revolution until it is in its original position. Conversely, the pole 108 will start at the said opposite side of the said plane through the center of the inner rotor 102, will move toward that plane during the first ninety degrees of the said revolution, will pass through and beyond that plane during the second ninety degrees of that revolution until it is as far on the said first side of the said plane as it was on the said opposite side of that plane at the start of that revolution, will then move back toward that plane during the third ninety degrees of that revolution, and will finally pass back through and beyond that plane during the fourth ninety degrees of that revolution until it is in its original position. The resulting relative axial displacement between those poles and the adjacent portions of the inner rotor 102 will cause that inner rotor to cut flux lines of the magnetic field provided by the permanent magnet 104; and, as that rotor cuts those flux lines, a current will flow through that inner rotor. That current will alternate during each half of each revolution of the inner and outer rotors 102 and 136; and hence an alternating current will be developed in that inner rotor. That alternating current will be sinusoidal in nature; and, as it flows through the inner rotor 102, thansformer action will cause sinusoidal alternating current to flow through the coils 92 and 94. Because the inner rotor 102 constitutes a one-turn primary winding while the coils 92 and 94 constitute a multi-turn secondary winding, the voltage across the output terminals of the coils 92 and 94 will be appreciable. That voltage will cause sinusoidal alternating current to flow through the primary winding 120; and the flow of that current will, by transformer action, cause sinusoidal alternating current to flow through the secondary winding 40. That current will be supplied to suitable phase sensitive detectors not shown. The greater the rate at which the spin axis of the outer rotor 136 rotates about an axis perpendicular to that spin axis, the greater will be the amplitude of the sinusoidal alternating current supplied to the phase sensitive detectors by the coils 92 and 94.

As the motor 66 rotates the outer rotor 136, it also rotates the rotor of the reference generator 48; and hence that reference generator will generate reference currents which also will be supplied to those phase sensitive detectors. The reference currents supplied by the reference generator 48 will be ninety degrees out of phase. As the phase sensitive detectors receive the current from the secondary winding 40 and also receive the currents from the reference generator 48, those phase sensitive detectors will be able to indicate the rate at, and the direction in, which the spin axis of the outer rotor 136 departs from the original axis of movement of the movable device. Consequently, the rate gyroscope provided by the present invention will be able to sense the rate and direction of rotation of the spin axis of the outer rotor 136 about any axis lying in a plane which is perpendicular to that spin axis. The phase sensitive detectors and the reference generator can be the phase sensitive detectors and the reference generator of co-pending application Ser. No. 163,159, for Gyroscopic Apparatus, which was filed by Allan W. Lindberg and Raymond H. Marcus on or about December 26, 1961.

While the inner rotor 102 will tend to continue to rotate about its spin axis, as the spin axis of the outer rotor 136 initially rotates about the said perpendicular axis, that inner rotor will respond to the shifting of the spin axis of that outer rotor to precess. Specifically, as the spin axis of the outer rotor 136 rotates about the said perpendicular axis, the generally spherical interiors of the cup-shaped portions 96 and 98 will apply frictional forces to the inner rotor 102; and those forces will generate precession torques for that inner rotor. Those precession torques will cause that inner rotor to precess about an axis which is perpendicular to the frictional forces applied to that inner rotor; and that axis will be substantially parallel to the said perpendicular axis about which the spin axis of the outer rotor 136 rotated. The overall result is that the inner rotor 102 will respond to the rotation of the spin axis of the outer rotor 136, about said perpendicular axis, to precess until the spin axes of the inner and outer rotors are again coincident.

If the spin axis of the outer rotor 136 rotates about the said perpendicular axis at a constant rate, the generally spherical interiors of the cup-shaped portions 96 and 98 will eventually apply constant frictional forces to the inner rotor 102; and those forces will generate constant precession torques for the inner rotor. Those precession torques will cause the spin axis of the inner rotor 102 to precess at the same rate and in the same direction as the spin axis of the outer rotor 136 rotates. Consequently, the angular displacement between the spin axes of the inner and outer rotors 102 and 136 will remain constant; and the amplitude and phase of the currents supplied to the phase sensitive detectors will remain constant. This means that those phase sensitive detectors will indicate that the orientation of the outer rotor 136— and hence of the movable device in which it is mounted— is departing from parallelism with its path of movement at a constant rate.

If the rate at which the spin axis of the outer rotor 136 rotates about the said perpendicular axis then increased, the spin axis of the inner rotor 102 would tend to lag further behind, and the amplitude of relative axial movement between the plane through the center of the magnetic field and portions of the inner rotor 102 would increase. Thereupon, the currents supplied to the phase sensitive detectors would increase and enable those phase sensitive detectors to indicate that the orientation of the outer rotor 136—and hence of the movable device in which it is mounted—was departing from parallelism with its path of movement at an increased rate. Conversely, if the rate at which the spin axis of the outer rotor 136 rotates about the said perpendicular axis decreased rather than increased, the spin axis of the inner rotor 102 would tend to catch up, and the amplitude of relative axial movement between the plane through the center of the magnetic field and portions of the inner rotor 102 would decrease. Thereupon the currents supplied to the phase sensitive detectors would decrease and enable those phase sensitive detectors to indicate that the orientation of the outer rotor 136—and hence of the movable device in which it is mounted—was departing from parallelism with its path of movement as a reduced rate. The overall result is that the gyroscope provided by the present invention can accurately and directly provide electric signals that can be used to indicate the rates at which a movable device, in which that gyroscope is mounted, is changing direction.

The axial displacement of the inner rotor 102 relative to the magnetic field provided by the permanent magnet 104 will be greatest at two points, spaced one hundred and eighty degrees apart, during each revolution of the outer rotor 136. The angular displacements between those points and the reference signals provided by the reference generator 48 will indicate the direction in which the movable device turned as it departed from parallelism with its axis of movement. Consequently, the gyroscope provided by the present invention can provide signals which can precisely indicate the direction as well as the rate of any departures of a movable vehicle from parallelism with its axis of movement.

It will be noted that when the spin axes of the outer rotor 136 and the inner rotor 102 are coincident, no signal is generated by that inner rotor and the magnetic field. Further, it will be noted that the signals which are generated by that inner rotor and that magnetic field are due solely to the sinusoidal axial displacement of that inner rotor relative to that magnetic field. Consequently, any bias errors could not affect the accuracy of the signals provided by the gyroscope of the present invention.

Further, it will be noted that the present invention measures a modulation of an angular relation rather than an absolute angular displacement. Consequently, the accuracy of measure can be high; and this, despite the fact that the rate gyroscope provided by the present invention is a very simple and reliable device.

Because the inner rotor 102 is a heavy liquid, and because that rotor is disposed within a recess large enough to permit that rotor to assume an annular configuration, that inner rotor is isolated from the effects of most of the disturbance torques normally present in gyroscopes. Consequently, that inner rotor has a very high inertial stability.

Also, because the inner rotor 102 is a heavy liquid which is disposed within a recess large enough to permit that rotor to assume an annular configuration, the present invention provides a high degree of mass balance. This desirable result can be attained because the center of mass of the inner rotor automatically becomes coincident with the center of support for that inner rotor as centrifugal action forms that inner rotor. The overall result is that the present invention makes it possible to substantially reduce all drifts which are sensitive to acceleration.

The gyroscope provided by the present invention is very sensitive to even limited rotation of the spin axis of the outer rotor 136 about axes perpendicular to that spin axis. Further, that gyroscope is able to respond to even very extensive rotation of that spin axis about those axes. In addition, that gyroscope is inexpensive to manufacture; and it is rugged and requires substantially no maintenance.

The motor which is used to rotate the molded member 136 will preferably be an electric motor, as shown by the drawing; because electric motors can be low in cost and are readily obtained. However, where desired, a gas-propelled, pneumatic, hydraulic or other motor could be used in lieu of the electric motor 66.

The gyroscope provided by the present invention can be made quite small and yet be very sensitive and very accurate. Specifically, the overall housing 20 of that gyroscope can be less than two inches in diameter and less than four inches in length. Since the motor 66 and the reference generator 48 are disposed within that housing, it will be apparent that the outer rotor 136 will be even smaller in size.

The transformer, which has the primary winding 120 and has the secondary winding 40, is very useful and effective. However, if desired, slip rings and brushes could be used in lieu of that transformer.

The primary use of the gyroscope provided by the present invention will be as a rate gyroscope. However, that gyroscope could be used as an inertial reference if its time constant were lengthened, as by increasing the diameter of the recess for the heavy liquid, by using a low viscosity fluid, and by providing other variations which would reduce the coupling between the inner and outer rotors.

Whereas the drawing and accompanying description have shown and described one preferred embodiment of the present invention it should be apparent to those skilled in the art that various changes may be made in the form of the invention without affecting the scope thereof.

What I claim is:

1. A rate gyroscope that comprises:
   (a) a housing,
   (b) bearings disposed within said housing to support a rotatable member,
   (c) said bearings enabling said member to rotate about a predetermined spin axis,
   (d) an electric motor disposed within said housing and having the rotor thereof connected to said member to rotate said member about said predetermined spin axis,
   (e) a generally spherical recess within said member,
   (f) a heavy, electrically-conductive liquid disposed within said recess,
   (g) said liquid only partially filling said recess,
   (h) said liquid responding to rotation of said member about said predetermined spin axis to form an annulus within said recess,
   (i) said liquid responding to rotation of said member about said predetermined spin axis to tend to rotate about said predetermined spin axis,
   (j) said member being adapted to serve as an outer rotor for said gyroscope,
   (k) said liquid being adapted to serve as an inner rotor for said gyroscope,
   (l) said liquid being adapted to rotate about said predetermined spin axis as long as said member rotates about said predetermined spin axis and tending to continue to rotate about said predetermined spin axis when said member is shifted to rotate about a further axis which is angularly displaced from said predetermined spin axis,
   (m) a magnetic core rotatable with said member,
   (n) a winding rotatable with said magnetic core and with said member,
   (o) said magnetic core and said winding constituting the magnetic core and the secondary winding of a transformer of which said liquid is a one turn primary winding,
   (p) a rotary transformer having the primary winding thereof connected to the first said winding and having the secondary winding thereof connectible to phase sensitive detectors,
   (q) a permanent magnet rotatable with said member and having the poles thereof directing magnetic flux lines through said recess,
   (r) a reference generator disposed within said housing and having the rotor thereof connected to and rotatable with said member,
   (s) said reference generator having the output thereof connectible to said phase sensitive detectors,
   (t) said liquid being adapted, whenever said member and said liquid are rotating about said predetermined spin axis, to cut substantially no flux lines from said permanent magnet but being adapted, when said member rotates about said further axis, to sinusoidally cut flux lines from said permanent magnet,
   (u) said liquid serving the function of the rotor of a signal generator and also serving the function of a one turn primary winding of a transformer, thereby enabling said magnetic core and the first said winding to apply a sinusoidal signal to the primary winding of said rotary transformer,
   (v) said rotary transformer enabling said secondary winding thereof to supply a sinusoidal signal to said phase sensitive detectors, (w) said reference generator providing a two phase signal to said phase sensitive detectors, whereby the direction of shift of said member can be detected, (x) the rate of shift of said member determining the amplitude of the sinusoidal cutting of said flux lines from said permanent magnet by said liquid, whereby said gyroscope can sense the rate of shifting of said member, (y) said magnetic core having an E-shaped portion and an I-shaped cap, (z) the middle arm of said E-shaped portion of said magnetic core extending through said recess and through said annulus formed by said liquid, (aa) the first said winding having one portion thereof telescoped over said middle arm of said E-shaped portion of said magnetic core and being adjacent one side of said recess, (ab) the first said winding having another portion thereof telescoped over said middle arm of said E-shaped portion of said magnetic core and being adjacent the opposite side of said recess, and (ac) cylindrical shields that shield and enclose portions of said member.

2. A rate gyroscope that comprises:

(a) a housing, (b) bearings disposed within said housing to support a rotatable member, (c) said bearings enabling said member to rotate about a predetermined spin axis, (d) a motor disposed within said housing to rotate said member about said predetermined spin axis, (e) a recess within said member, (f) an electrically-conductive liquid disposed within said recess, (g) said liquid only partially filling said recess, (h) said liquid responding to rotation of said member about said predetermined spin axis to form an annulus within said recess, (i) said liquid responding to rotation of said member about said predetermined spin axis to tend to rotate about said predetermined spin axis, (j) said member being adapted to serve as an outer rotor for said gyroscope, (k) said liquid being adapted to serve as an inner rotor for said gyroscope, (l) said liquid being adapted to rotate about said predetermined spin axis as long as said member rotates about said predetermined spin axis and tending to continue to rotate about said predetermined spin axis when said member is shifted to rotate about a further axis which is angularly displaced from said predetermined spin axis, (m) a magnetic core rotatable with said member, (n) a winding rotatable with said magnetic core and with said member, (o) said magnetic core and said winding constituting the magnetic core and the secondary winding of a transformer of which said liquid is a one turn primary winding, and (p) a permanent magnet rotatable with said member and having the poles thereof directing magnetic flux lines through said recess, (q) said liquid being adapted, whenever said member and said liquid are rotating about said predetermined spin axis, to cut substantially no flux lines from said permanent magnet but being adapted, when said member rotates about said further axis, to sinusoidally cut flux lines from said permanent magnet, (r) said liquid serving the function of the rotor of a signal generator and also serving the function of a one-turn primary winding of a transformer, thereby enabling said magnetic core and said winding to provide a sinusoidal signal, and (s) the rate of shift of said member determining the amplitude of the sinusoidal cutting of said flux lines from said permanent magnet by said liquid, whereby said gyroscope can sense the rate of shifting of said member.

3. A rate gyroscope that comprises:

(a) a member which is mounted for rotation about a predetermined spin axis, (b) A motor to rotate said member about said predetermined spin axis, (c) a recess within said member, (d) an electrically-conductive liquid disposed within said recess, (e) said liquid only partially filling said recess, (f) said liquid responding to rotation of said member about said predetermined spin axis to form an annulus within said recess, (g) said liquid responding to rotation of said member about said predetermined spin axis to tend to rotate about said predetermined spin axis, (h) said member being adapted to serve as an outer rotor for said gyroscope, (i) said liquid being adapted to serve as an inner rotor for said gyroscope, (j) said liquid being adapted to rotate about said predetermined spin axis as long as said member rotates about said predetermined spin axis and tending to continue to rotate about said predetermined spin axis when said member is shifted to rotate about a further axis which is angularly displaced from said predetermined spin axis, (k) a magnetic core rotatable with said member, (l) a winding rotatable with said magnetic core and with said member, (m) said magnetic core and said winding constituting the magnetic core and the secondary winding of a transformer of which said liquid is a one turn primary winding, and (n) a permanent magnet rotatable with said member and having the poles thereof directing magnetic flux lines through said recess, (o) said liquid being adapted, whenever said member and said liquid are rotating about said predetermined spin axis, to cut substantially no flux lines from said permanent magnet but being adapted when said member rotates about said further axis, to sinusoidally cut flux lines from said permanent magnet, (p) said liquid serving the function of the rotor of a signal generator and also serving the function of a one turn primary winding of a transformer, thereby enabling said magnetic core and the first said winding to apply to sinusoidal signal to the primary winding of said rotary transformer.

4. A rate gyroscope that comprises:

(a) a member which is mounted for rotation about a predetermined spin axis, (b) a source of motive power to rotate said member about said predetermined spin axis, (c) a recess within said member, (d) an electrically-conductive liquid disposed within said recess, (e) said liquid responding to rotation of said member about said predetermined spin axis to tend to rotate about said predetermined spin axis, (f) said member being adapted to serve as an outer rotor for said gyroscope, (g) said liquid being adapted to serve as an inner rotor for said gyroscope, (h) said liquid being adapted to rotate about said predetermined spin axis as long as said member rotates about said predetermined spin axis and tending to continue to rotate about said predetermined spin axis when said member is shifted to rotate about a further axis which is angularly displaced from said predetermined spin axis,
(i) a magnetic core,
(j) a winding,
(k) said magnetic core and said winding constituting the magnetic core and the secondary winding of a transformer of which said liquid is a one turn primary winding, and
(l) a permanent magnet directing flux lines through said recess,
(m) said liquid being adapted, whenever said member and said liquid are rotating about said predetermined spin axis, to cut substantially no flux lines from said permanent magnet but being adapted, when said member rotates about said further axis, to sinusoidally cut flux lines from said permanent magnet,
(n) said liquid serving the function of the rotor of a signal generator and also serving the function of a one turn primary winding of a transformer, thereby enabling said magnetic core and the first said winding to apply a sinusoidal signal to the primary winding of said rotary transformer.

5. A rate gyroscope that comprises:
(a) member which is mounted for rotation about a predetermined spin axis,
(b) a source of motive power to rotate said member about said predetermined spin axis,
(c) a recess within said member,
(d) an electrically-conductive liquid disposed within said recess,
(e) said liquid only partially filling said recess,
(f) said liquid responding to rotation of said member about said predetermined spin axis to form an annulus within said recess,
(g) said liquid responding to rotation of said member about said predetermined spin axis tend to rotate about said predetermined spin axis,
(h) said member being adapted to serve as an outer rotor for said gyroscope,
(i) said liquid being adapted to serve as an inner rotor for said gyroscope,
(j) said liquid being adapted to rotate about said predetermined spin axis as long as said member rotates about said predetermined spin axis and tending to continue to rotate about said predetermined spin axis when said member is shifted to rotate about a further axis which is angularly displaced from said predetermined spin axis,
(k) a magnetic core,
(l) a winding,
(m) said magnetic core and said winding constituting the magnetic core and the secondary winding of a transformer of which said liquid is a one turn primary winding, and
(n) a permanent magnet directing flux lines through said recess,
(o) said liquid being adapted, whenever said member and said liquid are rotating about said predetermined spin axis, to cut substantially no flux lines from said permanent magnet but being adapted, when said member rotates about said further axis, to sinusoidally cut flux lines from said predetermned magnet,
(p) said liquid serving the function of the rotor of a signal generator and also serving the function of a one turn primary winding of a transformer, thereby enabling said magnetic core and the first said winding to apply a sinusoidal signal,
(q) the rate of shift of said member determining the amplitude of the sinusoidal cutting of said flux lines from said permanent magnet by said liquid, whereby said gyroscope can sense the rate of shifting of said member.

6. A gyroscope that comprises:
(a) a member which is mounted for rotation about a predetermined spin axis,
(b) a source of motive power which can rotate said member about said predetermined spin axis,
(c) a recess within said member, and
(d) a liquid within said recess,
(e) said liquid responding to rotation of said member about said predetermined spin axis to tend to rotate about said predetermined spin axis,
(f) said member being adapted to serve as an outer rotor for said gyroscope,
(g) said liquid being adapted to serve as an inner rotor for said gyroscope,
(h) said liquid being adapted to rotate about said predetermined spin axis as long as said member rotates about said predetermined spin axis and tending to continue to rotate about said predetermined spin axis when said member is shifted to rotate about a further axis which is angularly displaced from said predetermined spin axis,
(i) a reference signal source, and
(j) an electric mechanism that can coact with said liquid to generate a signal,
(k) said reference signal source and said liquid and said electric mechanism coacting to indicate the direction in which said member shifted,
(l) said electric mechanism and said liquid coacting to indicate the rate of shifting of said member.

7. A gyroscope that comprises:
(a) a member which is mounted for rotation about a predetermined spin axis,
(b) a source of motive power which can rotate said member about said predetermined spin axis,
(c) a recess within said member, and
(d) a liquid within said recess,
(e) said liquid responding to rotation of said member about said predetermined spin axis to tend to rotate about said predetermined spin axis,
(f) said member being adapted to serve as an outer rotor for said gryoscope,
(g) said liquid being adapted to serve as an inner rotor for said gyroscope,
(h) said liquid being adapted to rotate about said predetermined spin axis as long as said member rotates about said predetermined spin axis and tending to continue to rotate about said predetermined spin axis when said member is shifted to rotate about a further axis which is angularly displaced from said predetermined spin axis,
(i) a reference signal source that comprises a reference generator with the rotor thereof rotatable with said member, and
(j) an electric mechanism that comprises a magnetic field and a winding that can coact with said liquid to generate a signal,
(k) said reference signal source and said liquid and said electric mechanism coacting to indicate the direction in which said member shifted,
(l) said electric mechanism and said liquid coacting to indicate the rate of shifting of said member.

8. A gyroscope that comprises:
(a) a member which is mounted for rotation about a predetermined spin axis,
(b) a source of motive power which can rotate said member about said predetermined spin axis,
(c) a recess within said member,
(d) a liquid within said recess,
(e) said liquid responding to rotation of said member about said predetermined spin axis to tend to rotate about said predetermined spin axis,
(f) said member being adapted to serve as an outer rotor for said gyroscope,
(g) said liquid being adapted to serve as an inner rotor for said gyroscope,
(h) said liquid being adapted to rotate about said predetermined spin axis as long as said member rotates about said predetermined spin axis and tending to continue to rotate about said predetermined spin axis when said member is shifted to rotate about a further axis which is angularly displaced from said predetermined spin axis, and
(i) an electric mechanism that comprises a magnetic field and a winding that can coact with said liquid to generate a signal,
(j) said electric mechanism and said liquid coacting to indicate the rate of shifting of said member.

9. A gyroscope that comprises:
(a) a member which is mounted for rotation about a predetermined spin axis,
(b) a source of motive power which can rotate said member about said predetermined spin axis,
(c) a recess within said member,
(d) a liquid within said recess,
(e) said liquid responding to rotation of said member about said predetermined spin axis to tend to rotate about said predetermined spin axis,
(f) said member being adapted to serve as an outer rotor for said gyroscope,
(g) said liquid being adapted to serve as an inner rotor for said gyroscope,
(h) said liquid being adapted to rotate about said predetermined spin axis as long as said member rotates about said predetermined spin axis and tending to continue to rotate about said predetermined spin axis when said member is shifted to rotate about a further axis which is angularly displaced from said predetermined spin axis,
(i) said liquid being electrically conductive, and
(j) a magnetic field in said member,
(k) said liquid serving as a generator rotor.

10. A gyroscope that comprises:
(a) a member which is mounted for rotation about a predetermined spin axis,
(b) a source of motive power which can rotate said member about said predetermined spin axis,
(c) a recess within said member,
(d) a liquid within said recess,
(e) said liquid responding to rotation of said member about said predetermined spin axis to tend to rotate about said predetermined spin axis,
(f) said member being adapted to serve as an outer rotor for said gyroscope,
(g) said liquid being adapted to serve as an inner rotor for said gyroscope,
(h) said liquid being adapted to rotate about said predetermined spin axis as long as said member rotates about said predetermined spin axis and tending to continue to rotate about said predetermined spin axis when said member is shifted to rotate about a further axis which is angularly displaced from said predetermined spin axis,
(i) said recess being of generally spherical form,
(j) said liquid being heavy and being electrically conductive,
(k) said liquid occupying just part of the total volume of said recess, whereby said liquid can move freely relative to said recess and whereby said liquid can respond to rotation of said member to form an annulus,
(l) a magnetic field directed through said recess,
(m) said liquid being adapted, when said member shifts to said further axis, to move sinusoidally relative to said member, and
(n) means that can respond to said relative sinusoidal movement of said liquid and member to provide a signal,
(o) the rate of shift of said member determining the amplitude of said relative sinusoidal movement of said liquid and member, whereby said gyroscope can sense the rate of shifting of said member.

11. A gyroscope that comprises:
(a) a member which is mounted for rotation about a predetermined spin axis,
(b) a source of motive power which can rotate said member about said predetermined spin axis,
(c) a recess within said member,
(d) a liquid within said recess,
(e) said liquid responding to rotation of said member about said predetermined spin axis to tend to rotate about said predetermined spin axis,
(f) said member being adapted to serve as an outer rotor for said gyroscope,
(g) said liquid being adapted to serve as an inner rotor for said gyroscope,
(h) said liquid being adapted to rotate about said predetermined spin axis as long as said member rotates about said predetermined spin axis and tending to continue to rotate about said predetermined spin axis when said member is shifted to rotate about a further axis which is angularly displaced from said predetermined spin axis,
(i) said liquid being heavy and being electrically conductive,
(j) said liquid occupying just part of the total volume of said recess, whereby said liquid can move freely relative to said recess and whereby said liquid can respond to rotation of said member to form an annulus,
(k) a magnetic field directed through said recess,
(l) said liquid being adapted, when said member shifts to said further axis, to move sinusoidally relative to said member, and
(m) means that can respond to said relative sinusoidal movement of said liquid and member to provide a signal.

12. A gyroscope that comprises:
(a) a member which is mounted for rotation about a predetermined spin axis,
(b) a source of motive power which can rotate said member about said predetermined spin axis,
(c) a recess within said member,
(d) a liquid within said recess,
(e) said liquid responding to rotation of said member about said predetermined spin axis to tend to rotate about said predetermined spin axis,
(f) said member being adapted to serve as an outer rotor for said gyroscope,
(g) said liquid being adapted to serve as an inner rotor for said gyroscope,
(h) said liquid being adapted to rotate about said predetermined spin axis as long as said member rotates about said predetermined spin axis and tending to continue to rotate about said predetermined spin axis when said member is shifted to rotate about a further axis which is angularly displaced from said predetermined spin axis,
(i) said liquid being heavy and being electrically conductive,
(j) a magnetic field directed through said recess,
(k) said liquid being adapted, when said member shifts to said further axis, to move sinusoidally relative to said member, and
(l) means that can respond to said relative sinusoidal movement of said liquid and member to provide a signal.

13. A gyroscope that comprises:
(a) a member which is mounted for rotation about a predetermined spin axis,
(b) a source of motive power to rotate said member about predetermined spin axis,
(c) a second member that is adapted to rotate about said predetermined spin axis as long as the first said member rotates about said predetermined spin axis,
(d) said second member tending to continue to rotate about said predetermined spin axis when the first said member is shifted to rotate about a further axis which is angularly displaced from said predetermined spin axis,
(e) a magnetic core, and
(f) a winding,
(g) said second member serving as the primary winding of a transformer which has said magnetic core and said winding as the magnetic core and secondary winding thereof.

14. A gyroscope that comprises:
(a) a member which is mounted for rotation about a predetermined spin axis,
(b) a source of motive power to rotate said member about predetermined spin axis,
(c) a second member that is adapted to rotate about said predetermined spin axis as long as the first said member rotates about said predetermined spin axis,
(d) said second member tending to continue to rotate about said predetermined spin axis when the first said member is shifted to rotate about a further axis which is angularly displaced from said predetermined spin axis,
(e) a magnetic core, and
(f) a winding,
(g) said second member serving as a one turn primary winding of a signal transformer which has said magnetic core and said winding as the magnetic core and secondary winding thereof,
(h) said second member responding to shifting of the first and member to said further axis to move sinusoidally relative to the first said member.

15. A gyroscope that comprises:
(a) a member which is mounted for rotation about a predetermined spin axis,
(b) a source of motive power which can rotate said member about said predetermined spin axis,
(c) a recess within said member,
(d) a liquid within said recess,
(e) said liquid responding to rotation of said member about said predetermined spin axis to tend to rotate about said predetermined spin axis,
(f) said member being adapted to serve as an outer rotor for said gyroscope,
(g) said liquid being adapted to serve as an inner rotor for said gyroscope,
(h) said liquid being adapted to rotate about said predetermined spin axis as long as said member rotates about said predetermined spin axis and tending to continue to rotate about said predetermined spin axis when said member is shifted to rotate about a further axis which is angularly displaced from said predetermined spin axis, and
(i) a sensing mechanism that senses any displacement between the axes of said liquid and of said member,
(j) a reference mechanism that supplies a signal which can help fix the direction of said displacement.

References Cited by the Examiner
UNITED STATES PATENTS
1,890,831   12/1932   Smyth _____ 74—5.7 X FRED C. MATTERN, Jr., *Primary Examiner.*

PALMER W. SULLIVAN, *Examiner.*